United States Patent
Colombo et al.

(10) Patent No.: US 6,493,498 B1
(45) Date of Patent: Dec. 10, 2002

(54) FIBER ADMINISTRATION SYSTEM HAVING OPTICAL FIBER ROUTE TRACING CAPABILITIES

(75) Inventors: Bruce A. Colombo, Pompton Plains, NJ (US); Robert E. Frahm, Flemington, NJ (US); Mark R. Jennings, Andover, NJ (US); Frank S. Leone, Berkeley Heights, NJ (US); Richard J. Pimpinella, Hampton, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/329,750

(22) Filed: Jun. 10, 1999

(51) Int. Cl.[7] .................................................. G02B 6/00
(52) U.S. Cl. ...................................... 385/134; 385/135
(58) Field of Search .................................. 385/134, 135; 361/826, 828, 829, 832

(56) References Cited

U.S. PATENT DOCUMENTS 5,265,187 A  * 11/1993 Morin et al. ................. 385/135
5,394,503 A  *  2/1995 Dietz et al. .................. 385/134
6,002,331 A  * 12/1999 Laor ............................ 324/539

* cited by examiner

Primary Examiner—Hemang Sanghavi
Assistant Examiner—Omar Rojas
(74) Attorney, Agent, or Firm—Gibbons, Del Deo, Dolan, Griffinger & Vecchione

(57) ABSTRACT

An improved fiber administration system and method of operation for a fiber distribution system. The fiber administration system contains at least one frame, wherein each frame contains a plurality of fiber distribution shelves. The different fiber distribution shelves contain numerous optical connector ports. The various optical connector ports are interconnected throughout the fiber distribution system with optical fibers. The optical fiber pass through numerous routing pathways on the frame as they travel between points on the frame. A plurality of lights are disposed on the frame proximate the different routing pathways. A controller is provided to selectively light some of the lights that correspond in position to one selected routing pathway, among the numerous possible routing pathways. The light thereby provides a visual indication of a specific routing path.

17 Claims, 2 Drawing Sheets

FIBER ADMINISTRATION SYSTEM HAVING OPTICAL FIBER ROUTE TRACING CAPABILITIES

BACKGROUND OF THE INVENTION

1. Field of the Invention

The present invention relates to the structure of optical fiber administration systems. More particularly, the present invention relates to systems and methods of tracing the routing path of specific optical fibers from point-to-point within the optical fiber administration system.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Referring to FIG. 1, a typical prior art fiber administration system 10 is shown. The fiber administration system 10 contains at least one optical distribution frame 12. The optical distribution frame 12 is located at the central office of the telecommunications provider. The optical distribution frame 12 defines a plurality of bays 15, wherein each bay houses several fiber distribution shelves 14. On each of the fiber distribution shelves 14 are a plurality of optical connection ports that receive the ends of all of the individual optical fibers that enter the central office and are contained within the optical fiber network. By terminating each optical fiber at an optical connection port on one of the different fiber distribution shelves 14, the location of each optical is fiber becomes known within the overall assembly.

A fiber distribution system 10 may contain hundreds or thousands of optical connection ports. Accordingly, there can be hundreds or thousands of optical fibers that are routed between the various fiber distribution shelves 14. Within the confines of the optical distribution frame 12, space is limited. Accordingly, the routing of the various optical fibers is not done randomly. Rather, algorithms have been developed that inform a technician as to how to route a particular optical fiber so that no one routing track becomes over utilized. The algorithms are run by the systems controller 20 of the fiber administration system 10. As such, a technician can view the display screen 22 of the systems controller in order to see a desired routing path for any particular optical fiber.

In order to maintain the quality and integrity of the fiber administration system, the various optical fibers are periodically disconnected from the optical network and are connected to various types of test equipment. Additionally, as the fiber network grows, certain optical fibers get rerouted within the fiber administration system. It is often difficult for a technician to find a specific optical connection port in the hundreds of optical connection ports available in a fiber administration system. Accordingly, it is not uncommon for a technician to accidentally select the wrong optical connection port and disrupt an optical fiber pathway that should not have been disrupted.

In an attempt to assist a technician in finding a specific optical connection port, tracing systems have been developed that provide a visible indication as to the location of a targeted optical connection port. Such prior art tracing systems are exemplified by U.S. Pat. No. 5,448,675 to Leone, entitled Telecommunications Distribution Frame With Tracing. In such systems, a light is lit next to the optical connection port being targeted. A technician can see the light and is immediately led to the targeted optical connection port.

However, the use of line tracing systems only informs a technician as to the starting point and the ending point of a particular optical fiber in the fiber administration network. The tracing system does not indicate to the technician the routing path that the optical fiber takes when traveling between those points.

The routing algorithms run by the systems controller of the fiber administration system may produce highly complex routing schemes through the optical distribution frame. As a technician begins to run an optical fiber, that technician often does not remember the routing path plotted by the systems controller. Consequently, the technician must often recheck the plotted path. However, technicians often make mistakes when routing optical fibers. Accordingly, an optical fiber may not follow the specific routing path that the systems controller believes that optical fiber should follow. This leads to confusion in subsequent maintenance procedures, wherein a technician finds differences between the actual routing path of optical fibers and the preferred routing path of optical fibers recorded in the systems controller. Such disparities can lead to a technician accidentally disconnecting the wrong optical fiber and disrupting the wrong optical pathway within the fiber administration system.

A need therefore exists for an system and method that better identifies a specific optical fiber routing path in a fiber administration system to better assist a technician in routing optical fibers consistently with the routing pathways selected by the systems controller.

SUMMARY OF THE INVENTION

The present invention is an improved fiber administration system and method of operation for a fiber distribution system. The fiber administration system contains at least one frame, wherein each frame contains a plurality of fiber distribution shelves. The different fiber distribution shelves contain numerous optical connector ports. The various optical connector ports are interconnected throughout the fiber distribution system with optical fibers. The optical fiber pass through numerous routing pathways on the frame as they travel between paints on the frame.

A plurality of lights are disposed on the frame proximate the different routing pathways. A controller is provided to selectively light some of the lights that correspond in position to one selected routing pathway, among the numerous possible routing pathways. The lights thereby provide a visual indication of a specific routing path that is proper for any selected optical fiber used in the fiber administration system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
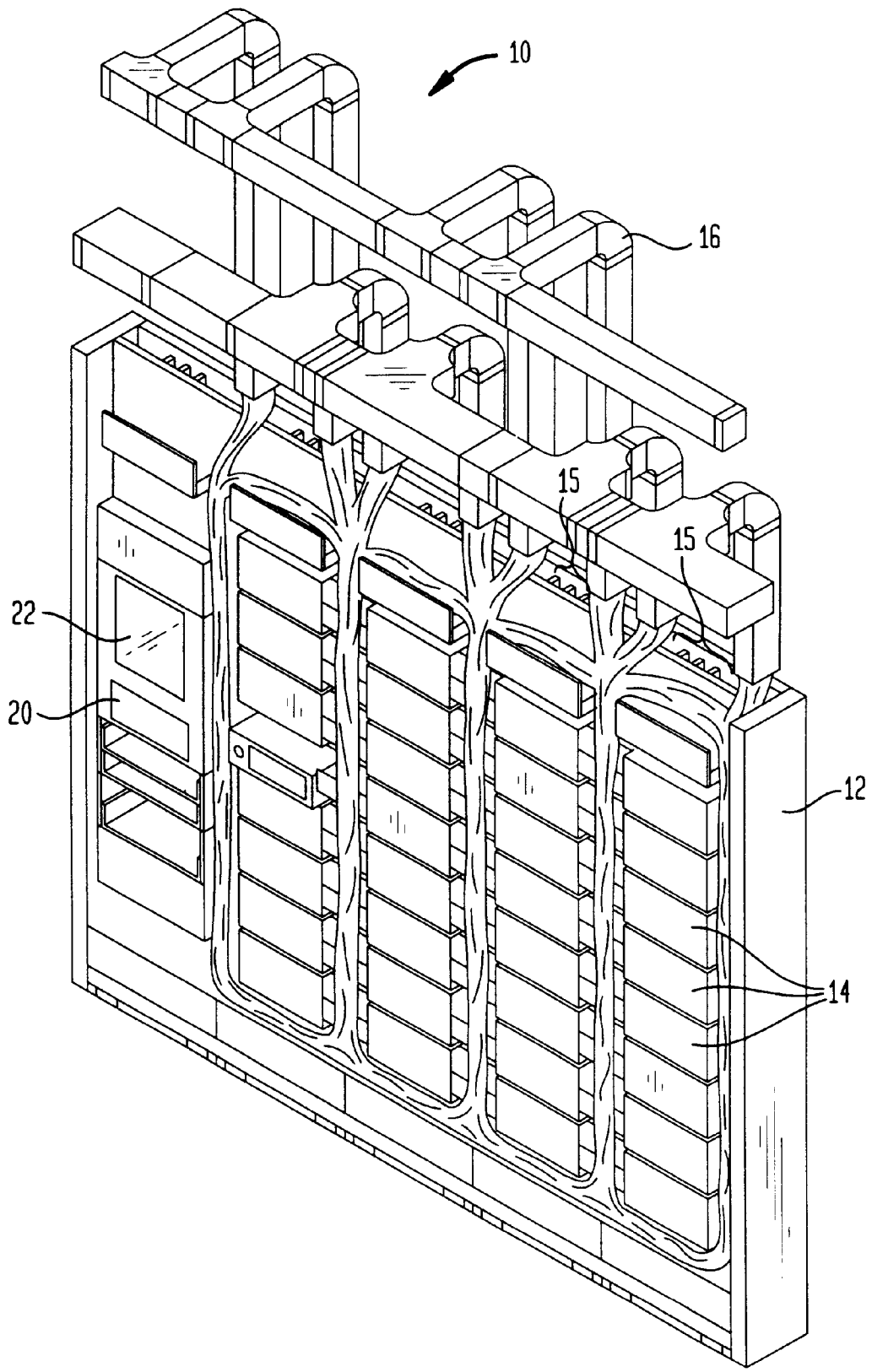
FIG. 1 is a perspective view of a prior art optical fiber administration system containing a first plurality of bays and a second plurality of fiber distribution shelves in each bay.
Figure 2:
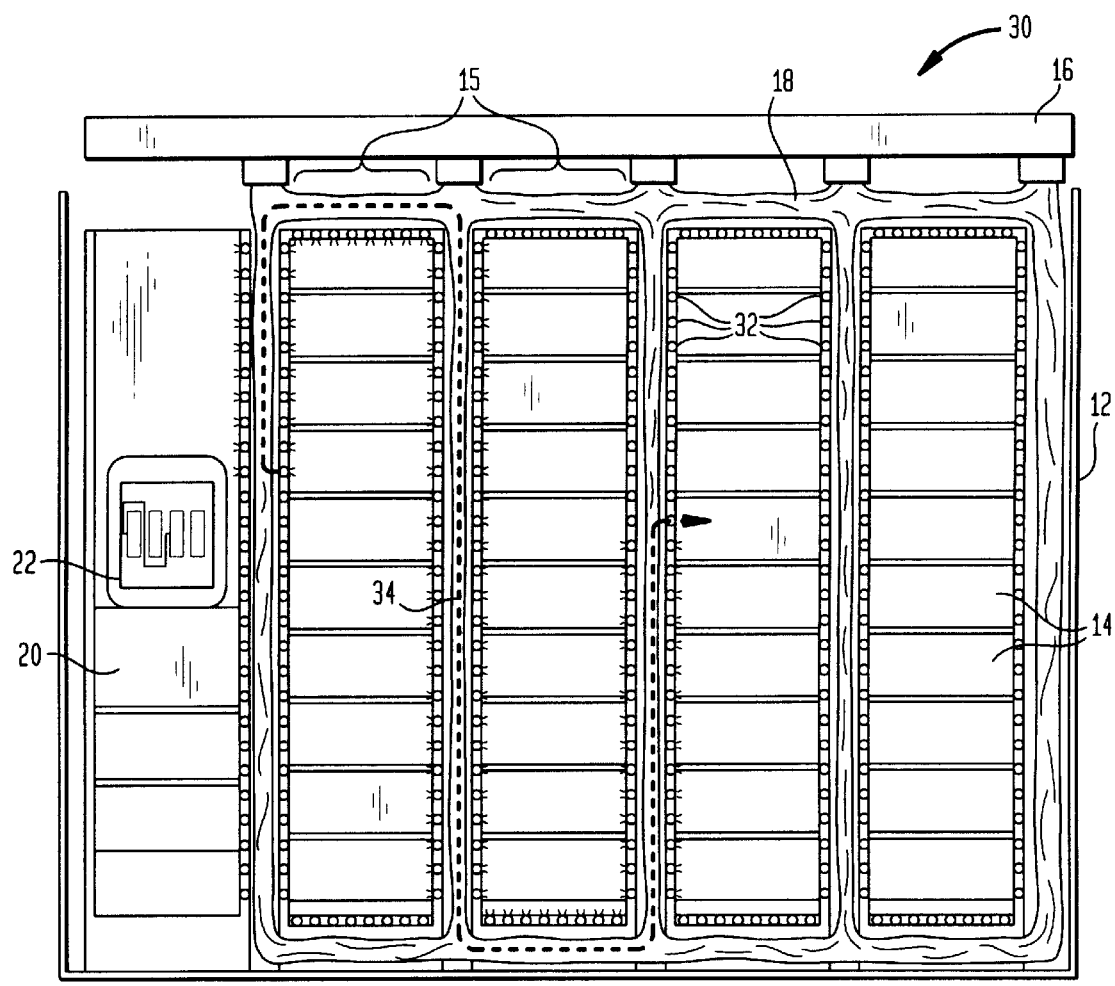
FIG. 2 is a front view of a fiber administration system in accordance with the present invention.

In FIG. 2, an improved fiber administration system 30 is shown in accordance with the present invention. The fiber administration system 30 contains at least one optical fiber distribution frame 12. The fiber distribution frame 12 defines a plurality of bays 15. Each bay 15 is a vertical structure that supports a plurality of fiber distribution shelves 14. A network of conduits 16 lead the various optical fibers 18 to and from the various bays 15 in the fiber distribution frame 12. The various optical fibers 18 within the fiber distribution frame 12 are routed in paths around and between the various bays 15. Accordingly, optical fibers 18 pass around the top, bottom and sides of each bay 15 as the optical fibers 18 travel from point to point within the fiber administration system 30.

In addition to the fiber distribution shelves 14, the fiber administration system 30 also includes a systems controller 20. The systems controller 20 runs software used to inform a technician of the preferred routing of any one optical fiber around and along the various bays 15.

In the embodiment of the fiber administration system 30 shown, a plurality of lights 32 are disposed along the top, bottom and side edges of each of the bays 15 in the fiber distribution frame 12. The lights 15 can be incandescent bulbs, however, in an exemplary embodiment, the lights 32 are light emitting diodes (LEDs). Each of the lights 32 is coupled to the systems controller 20 of the fiber administration system 30. Accordingly, the systems controller 20 has the ability to light any plurality of the lights 32 in any sequence.

When a technician accesses the systems controller 20 and runs the software that indicates the desired routing path of a particular optical fiber, that routing path is displayed on the display screen 22 of the systems controller 20. Simultaneously, the systems controller 20 lights the lights 32 on the distribution frame that correspond to the displayed routing path. In the shown embodiment, a routing path selected by the systems controller 20 is indicated by the dashed line 34. The lights 32 corresponding to the path of the dashed line 34 are lit by the systems controller 20. Accordingly, a technician can now follow the lights 32 on the distribution frame 12 when running the optical fiber. The technician, therefore does not have to remember the routing path selected by the systems controller 20. Rather, the routing path selected by the systems controller 20 is illuminated directly on the distribution frame 12 and the bays 15 within the distribution frame 20. The technician needs only to follow the illuminated routing path in order to properly route a particular optical fiber.

The lights 32 disposed along the fiber distribution frame 12 and bays 15 can have many different spacings. However, the lights 32 should be spaced close enough together so that the lights 32 can be used to identify any one fiber distribution shelf 14 contained within the frame 12.

The systems controller 20 can light the lights 32 along any routing path in many different ways. The lights 32 can be lit all at once, flashed or sequentially lit to indicate the direction of the routing path. The selection of how the different lights 32 are lit is a programming option.

It will be understood that the embodiment of the present invention specifically shown and described is merely exemplary and that a person skilled in the art can make alternate embodiments using different configurations and functionally equivalent components. For example, the locations of the various lights can be placed at locations on the distribution shelve other than is shown. Furthermore, the number of lights per unit length and the size of the lights can also be varied from that which is illustrated. All such alternate embodiments are intended to be included in the scope of this invention as set forth in the following claims.

What is claimed is:

1. A fiber administration system, comprising:
   at least one frame, wherein each said frame contains a plurality of fiber distribution shelves;
   a plurality of lights disposed on said frame, wherein at least one of said plurality of lights is positioned proximate each of said fiber distribution shelves;
   a controller for selectively lighting some of said lights to indicate a selected pathway within said frame from a predetermined point on said frame to a selected one of said fiber distribution shelves; and
   wherein said fiber distribution shelves are contained within bays within said frame, and optical fiber pathways extend around each of said bays, wherein at least some of said plurality of lights are disposed proximate said optical fiber pathways so as to indicate routing paths within said optical fiber pathways when lit.

2. The system according to claim 1, wherein said controller is a computer having a display screen.

3. The system according to claim 2, wherein said computer displays said selected pathway on said display screen while simultaneously lighting said lights on said frame showing said selected pathway.

4. The system according to claim 1, wherein said plurality of lights are light emitting diodes.

5. The system according to claim 1, wherein said controller sequentially lights the lights along said selected path in a predetermined pattern.

6. In a system having multiple connector ports that are interconnected by flexible connectors, a system for routing the flexible connectors, comprising:
   a plurality of different routing paths between the connector ports through which the flexible connectors can pass;
   a plurality of lights disposed proximate each routing path;
   a controller for selectively lighting some of said plurality of lights to indicate one specific routing path from said plurality of different routing paths; and
   wherein the system further comprises at least one frame, said frame comprises bays, and each routing path extends around each of said bays.

7. The system according to claim 6, wherein said controller is a computer having a display screen.

8. The system according to claim 6, wherein said computer displays said specific routing path on said display screen while simultaneously lighting some of said lights to indicate said specific routing path.

9. The system according to claim 6, wherein said plurality of lights are light emitting diodes.

10. The system according to claim 6, wherein said controller sequentially lights the lights along said specific routing path in a predetermined pattern.

11. The system according to claim 6, wherein the flexible connectors are optical fibers.

12. In a system where connectors are routed between points along multiple different routing paths, a method of visually indicating a selected routing path, comprising the steps of:

provides lights proximate each of said routing paths between points;

selectively illuminating only the lights located along the selected routing path so as to provide a visual indication of the selected routing path; and wherein the system comprises at least one frame, said frame comprises bays, and each routing path extends around each of said bays.

13. The method according to claim 12, further including the step of sequentially lighting the lights located along the selected routing path.

14. The method according to claim 12, further including the step of selecting said selected routing path with a computer.

15. The method according to claim 14, wherein said lights are coupled to said computer and said computer selectively lights the lights located along said selected routing path.

16. The method according to claim 14, wherein said computer has a display screen.

17. The method according to claim 16, further including the step of displaying said selected routing path on said display screen.

\* \* \* \* \*